US008452911B2

(12) United States Patent
Gorobets et al.

(10) Patent No.: US 8,452,911 B2
(45) Date of Patent: May 28, 2013

(54) SYNCHRONIZED MAINTENANCE OPERATIONS IN A MULTI-BANK STORAGE SYSTEM

(75) Inventors: Sergey Anatolievich Gorobets, Edinburgh (GB); Alan David Bennett, Edinburgh (GB); Charles Michael Schroter, Los Gatos, CA (US); Eugene Zilberman, Richmond Hill (CA)

(73) Assignee: SanDisk Technologies Inc., Plano, TX (US)

( * ) Notice: Subject to any disclaimer, the term of this patent is extended or adjusted under 35 U.S.C. 154(b) by 139 days.

(21) Appl. No.: 12/895,383

(22) Filed: Sep. 30, 2010

(65) Prior Publication Data

US 2012/0084489 A1 Apr. 5, 2012

(51) Int. Cl.
*G06F 12/00* (2006.01)
*G06F 12/02* (2006.01)

(52) U.S. Cl.
USPC .. 711/5; 711/103; 711/E12.001; 711/E12.008

(58) Field of Classification Search
USPC .................. 711/5, 103, E12.001, E12.008
See application file for complete search history.

(56) References Cited

U.S. PATENT DOCUMENTS

| | | | |
|---|---|---|---|
| 5,535,369 A | 7/1996 | Wells et al. | |
| 5,570,315 A | 10/1996 | Tanaka et al. | |
| 5,630,093 A | 5/1997 | Holzhammer et al. | |
| 5,774,397 A | 6/1998 | Endoh et al. | |
| 5,860,124 A | 1/1999 | Matthews et al. | |
| 5,960,169 A | 9/1999 | Styczinski | |
| 6,046,935 A | 4/2000 | Takeuchi et al. | |
| 6,069,827 A | 5/2000 | Sinclair | |
| 6,373,746 B1 | 4/2002 | Takeuchi et al. | |
| 6,456,528 B1 | 9/2002 | Chen | |
| 6,522,580 B2 | 2/2003 | Chen et al. | |
| 6,622,199 B1 | 9/2003 | Spall et al. | |
| 6,715,027 B2 | 3/2004 | Kim et al. | |
| 6,725,321 B1 | 4/2004 | Sinclair et al. | |

(Continued)

FOREIGN PATENT DOCUMENTS

| | | | |
|---|---|---|---|
| EP | 1 143 455 A2 | 10/2001 | |
| EP | 1 389 755 A2 | 2/2004 | |
| EP | 1 693 759 A2 | 8/2006 | |

OTHER PUBLICATIONS

U.S. Appl. No. 12/632,549, filed Dec. 7, 2009, 43 pages.

(Continued)

*Primary Examiner* — Yong Choe
(74) *Attorney, Agent, or Firm* — Brinks Hofer Gilson & Lione (57) ABSTRACT

A method and system for managing maintenance operations in a multi-bank non-volatile storage device is disclosed. The method includes receiving a data write command and associated data from a host system for storage in the non-volatile storage device and directing a head of the data write command to a first bank in the and a tail of the data write command to a second bank, where the head of the data write command only includes data having logical block addresses preceding logical block addresses of data in the tail of the data write command. When a status of the first bank delays execution of the data write command the controller executes a second bank maintenance procedure in the second bank while the data write command directed to the first and second banks is pending. The system includes a plurality of banks, where each bank may be associated with the same or different controllers, and the one or more controllers are adapted to execute the method noted above.

21 Claims, 10 Drawing Sheets

U.S. PATENT DOCUMENTS

| | | |
|---|---|---|
| 6,771,536 B2 | 8/2004 | Li et al. |
| 6,781,877 B2 | 8/2004 | Cernea et al. |
| 7,012,835 B2 | 3/2006 | Gonzalez et al. |
| 7,154,781 B2 | 12/2006 | Lakhani et al. |
| 7,349,258 B2 | 3/2008 | Fong et al. |
| 7,420,867 B2 | 9/2008 | Brox |
| 7,433,993 B2 | 10/2008 | Sinclair |
| 7,490,283 B2 | 2/2009 | Gorobets et al. |
| 7,552,280 B1 | 6/2009 | Naamad et al. |
| 7,930,468 B2 | 4/2011 | Caulkins |
| 8,095,735 B2 | 1/2012 | Brewer et al. |
| 2003/0109093 A1 | 6/2003 | Harari et al. |
| 2003/0147278 A1 | 8/2003 | Tanaka et al. |
| 2003/0229753 A1 | 12/2003 | Hwang et al. |
| 2004/0030847 A1 | 2/2004 | Tremaine |
| 2004/0260957 A1 | 12/2004 | Jeddeloh et al. |
| 2005/0144361 A1 | 6/2005 | Gonzalez et al. |
| 2005/0144363 A1 | 6/2005 | Sinclair |
| 2005/0144365 A1 | 6/2005 | Gorobets et al. |
| 2005/0195635 A1 | 9/2005 | Conley et al. |
| 2005/0204187 A1 | 9/2005 | Lee et al. |
| 2006/0020744 A1 | 1/2006 | Sinclair et al. |
| 2006/0031593 A1 | 2/2006 | Sinclair |
| 2006/0047800 A1 | 3/2006 | Caveney et al. |
| 2006/0161724 A1 | 7/2006 | Bennett et al. |
| 2006/0161728 A1 | 7/2006 | Bennett et al. |
| 2006/0285397 A1 | 12/2006 | Nishihara et al. |
| 2007/0033323 A1 | 2/2007 | Gorobets |
| 2007/0033330 A1 | 2/2007 | Sinclair et al. |
| 2007/0033378 A1 | 2/2007 | Sinclair et al. |
| 2007/0136555 A1 | 6/2007 | Sinclair |
| 2007/0239928 A1 | 10/2007 | Gera et al. |
| 2008/0034154 A1 | 2/2008 | Lee et al. |
| 2008/0094952 A1 | 4/2008 | Brondijk et al. |
| 2008/0307164 A1 | 12/2008 | Sinclair |
| 2008/0307192 A1 | 12/2008 | Sinclair |
| 2008/0320209 A1 | 12/2008 | Lee et al. |
| 2009/0089482 A1 | 4/2009 | Traister |
| 2009/0157994 A1 | 6/2009 | Hampel et al. |
| 2009/0172258 A1 | 7/2009 | Olbrich et al. |
| 2009/0172263 A1 | 7/2009 | Olbrich et al. |
| 2009/0196102 A1 | 8/2009 | Kim |
| 2009/0271562 A1 | 10/2009 | Sinclair |
| 2011/0138100 A1 | 6/2011 | Sinclair |

OTHER PUBLICATIONS

Chang et al., "An Efficient Management Scheme for Large-Scale Flash-Memory Storage Systems", dated Mar. 14-17, 2004 (7 pages).

F. Shu, "Notification of Deleted Data Proposal for ATA8-ACS2", Microsoft Corporation, dated Apr. 21, 2007, printed from the Internet at http://www.t13.org/documents/UploadedDocuments//docs2007/e07154r0-Notification_for_Deleted_Data_Proposal_for_ATA-ACS2.doc on Feb. 22, 2008 (4 pages).

F. Shu, "Solid State Drive Identify Proposal for ATA8-ACS", Microsoft Corporation, dated Apr. 21, 2007, printed from the Internet at http://www.t13.org/documents/UploadedDocuments//docs2007/e07153r0-Soild_State_Drive_Identify_Proposal.doc on Feb. 22, 2008 (4 pages).

International Preliminary Report on Patentability for international application No. PCT/US2010/056122, mailed Jun. 12, 2012 (6 pages).

International Search Report for international application No. PCT/US2009/040153, mailed on Jul. 10, 2009 (3 pages).

International Search Report issued in international application No. PCT/US2010/056122, mailed May 20, 2011 (4 pages).

Office Action issued in European patent application No. 09733928.7, dated Aug. 22, 2012 (6 pages).

Office Action issued in U.S. Appl. No. 12/036,014, dated Sep. 28, 2011 (11 pages).

Office Action issued in U.S. Appl. No. 12/036,023, dated Apr. 12, 2011 (16 pages).

Office Action issued in U.S. Appl. No. 12/036,023, dated Nov. 8, 2011 (17 pages).

Office Action issued in U.S. Appl. No. 12/632,549, dated Feb. 7, 2012 (14 pages).

Office Action issued in U.S. Appl. No. 12/632,549, dated Aug. 20, 2012 (16 pages).

Preliminary Report on Patentability and Written Opinion of the International Searching Authority for related application No. PCT/US2008/065631, mailed Dec. 23, 2009 (9 pages).

Written Opinion for international application No. PCT/US2009/040153 mailed on Jul. 10, 2009 (5 pages).

Written Opinion issued in international application No. PCT/US2010/056122, mailed May 20, 2011 (4 pages).

| Bank | Status | Time | Metapages |
|---|---|---|---|
| 0 | Maintenance | 1 | 2 |
| 1 | Idle | 0 | 0 |
| 2 | Host Write | 3 | 4 |
| 3 | Maintenance | 6 | 6 |
| .... | .... | .... | .... |
| N | Idle | 0 | 0 |

FIG. 11

SYNCHRONIZED MAINTENANCE OPERATIONS IN A MULTI-BANK STORAGE SYSTEM

TECHNICAL FIELD

This application relates generally to managing data in a storage system. More specifically, this application relates to the operation of a storage system to allow for synchronizing maintenance operations in re-programmable non-volatile semiconductor flash memory.

BACKGROUND

When writing data to a flash data storage system, a host typically assigns unique logical addresses to sectors, clusters or other units of data within a continuous virtual address space of the storage system. The host writes data to, and reads data from, addresses within the logical address space of the storage system. The storage system then commonly maps data between the logical address space and the physical blocks or metablocks of the memory, where data is stored in fixed logical groups corresponding to ranges in the logical address space. Generally, each fixed logical group is stored in a separate physical block of the storage system.

Data updates sent by a host to such a storage system create partially obsolete blocks where valid data occupies part of a block and obsolete data occupies the rest of the block. Free space can generally only be reclaimed in flash memory by performing data copy operations, such logical group consolidation (also referred to as garbage collection) or temporary block compaction, on the partially obsolete blocks. Such operations can take a toll on memory endurance and performance. These types of maintenance operations may be triggered by receipt of a write command from a host. Other types of maintenance operations, such as wear leveling and read scrub operations, may also be executed that are not be triggered by a host write command. Any of these operations, when executed during command execution time, are generally referred to as foreground operations and may negatively impact the storage system's performance.

In multi-bank data storage systems, where logical space is distributed between independent banks, each bank may trigger a maintenance operation independently from the other. A maintenance operation that takes place as a foreground operation in one bank may delay execution of a host command in another bank. This delay of execution of a pending host command can be exacerbated if the banks independently initiate foreground maintenance operations in sequence. For example, in a two bank storage system, a pending host command could be delayed for double the maintenance time of one bank if the banks execute their respective maintenance operations serially. The problem of delays due to the maintenance operations in different banks may increase in storage systems where write operations switch frequently between banks to minimize the need for a large buffer RAM.

BRIEF SUMMARY

In order to address the need for improved memory management in a multi-bank storage system, methods and systems are disclosed herein for managing maintenance operations.

According to a first aspect, a method of managing maintenance operations in a non-volatile storage device is disclosed. The controller in a non-volatile storage device having a plurality of banks of memory cells, where each of the banks is arranged in blocks of memory cells that are erasable together, receives a data write command and associated data from a host system for storage in the non-volatile storage device. The head of the data write command is directed to a first bank in the plurality of banks and a tail of the data write command to a second bank in the plurality of banks, where the head of the data write command comprises data having logical block addresses preceding logical block addresses of data in the tail of the data write command. A second bank maintenance procedure is executed in the second bank while the data write command directed to the first and second banks is pending when a status of the first bank delays execution of the data write command. In one implementation, the status of the first bank may be that the first bank is currently executing a first bank maintenance procedure and a buffer of the first bank is unable to store data associated with the head of the data write command. Additionally, the second bank maintenance procedure may only be executed while the first bank maintenance procedure is being executed.

In another aspect, a method of managing maintenance operations in a non-volatile storage device having a controller and a plurality of banks of memory cells, wherein each of the plurality of banks is arranged in blocks of memory cells that are erasable together, includes receiving a data write command and associated data from a host system for storage in the non-volatile storage device. The data write command is directed to at least two banks of the plurality of banks to store the received data and a status of a first bank of the at least two banks is detected for a next bank of the at least two banks. A second maintenance procedure is executed in the next bank of the at least two banks when a data buffer for the first bank is full and the first bank is detected to be executing a first maintenance procedure while the data write command directed to the at least two banks is pending.

In different implementations, the method may also include updating a status array in the non-volatile storage system with a current status of each of the banks, such that detecting for the next bank the status of the first bank includes the next bank accessing the status array. Time duration information for the first maintenance procedure may be accessed from the status array so that execution of the second maintenance procedure is limited to a time that does not exceed the accessed time duration information for the first maintenance procedure. Alternatively, each of the plurality of banks may include a flash memory access engine and detecting the status of the first bank includes the next bank detecting a status of a flash memory access engine of the first bank to determine if the first bank is engaged in a maintenance operation.

According to another aspect, a storage system includes non-volatile storage, the non-volatile storage having a plurality of banks of memory cells, wherein each of the plurality of banks is arranged in blocks of memory cells that are erasable together, and a controller in communication with the plurality of banks of memory cells that is configured to execute one or more of the methods described above.

Other features and advantages will become apparent upon review of the following drawings, detailed description and claims. Additionally, other embodiments are disclosed, and each of the embodiments can be used alone or together in combination. The embodiments will now be described with reference to the attached drawings.

DETAILED DESCRIPTION

Figure 1:
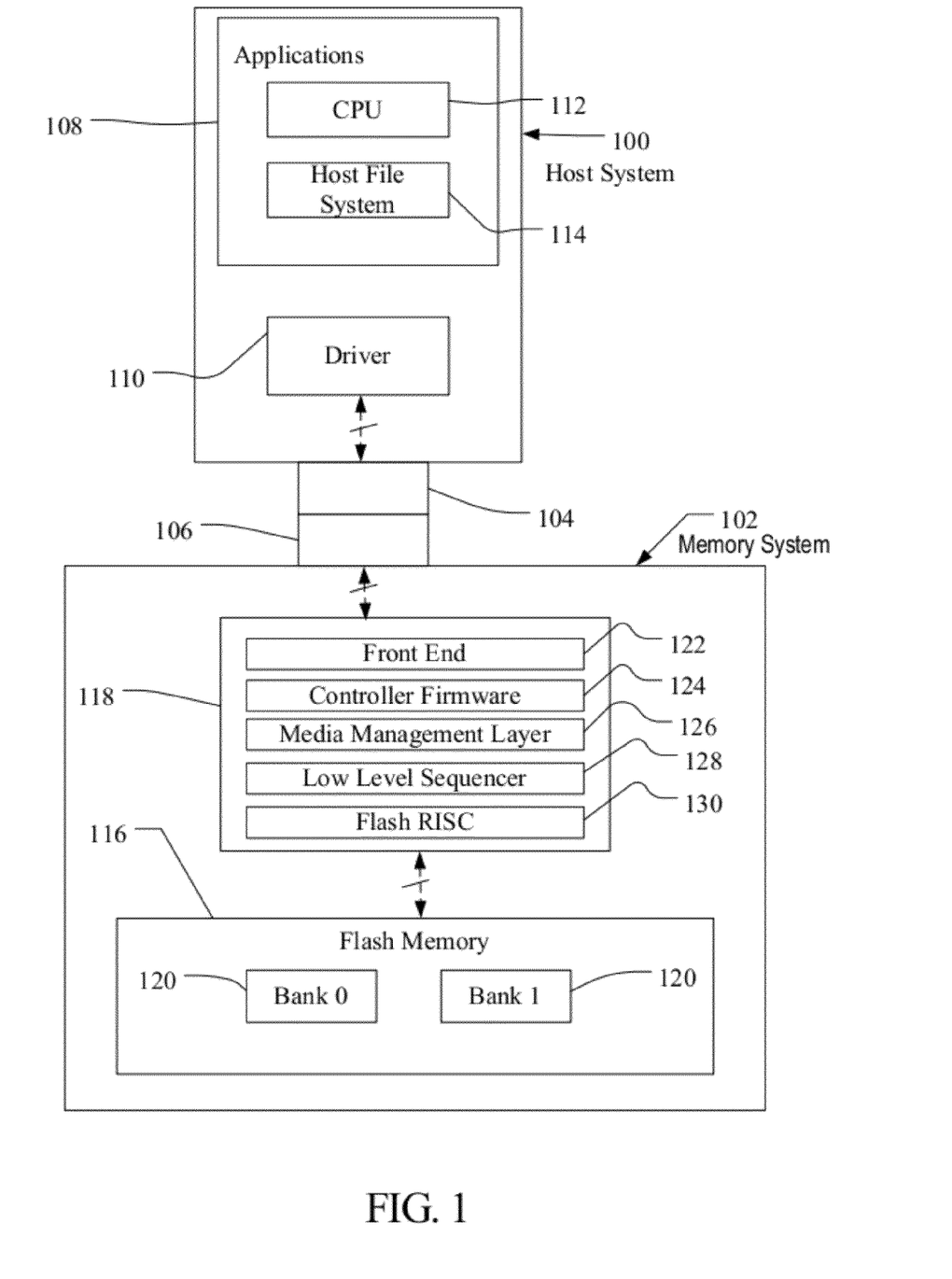
FIG. 1 illustrates a host connected with a storage device having multi-bank non-volatile memory.

A flash storage system suitable for use in implementing aspects of the invention is shown in FIGS. 1-7. A host system 100 of FIG. 1 stores data into and retrieves data from a storage system 102. The storage system may be flash memory embedded within the host, such as in the form of a solid state disk (SSD) drive installed in a personal computer. Alternatively, the storage system 102 may be in the form of a card that is removably connected to the host through mating parts 104 and 106 of a mechanical and electrical connector as illustrated in FIG. 1. A flash memory configured for use as an internal or embedded SSD drive may look similar to the schematic of FIG. 1, with the primary difference being the location of the storage system 102 internal to the host. SSD drives may be in the form of discrete modules that are drop-in replacements for rotating magnetic disk drives.

One example of a commercially available SSD drive is a 32 gigabyte SSD produced by SanDisk Corporation. Examples of commercially available removable flash memory cards include CompactFlash (CF), MultiMediaCard (MMC), Secure Digital (SD), miniSD, Memory Stick, and TransFlash cards. Although each of these cards has a unique mechanical and/or electrical interface according to its standardized specifications, the flash storage system included in each is similar. These cards are all available from SanDisk Corporation, assignee of the present application. SanDisk also provides a line of flash drives under its Cruzer trademark, which are hand held storage systems in small packages that have a Universal Serial Bus (USB) plug for connecting with a host by plugging into the host's USB receptacle. Each of these memory cards and flash drives includes controllers that interface with the host and control operation of the flash memory within them.

Host systems that may use SSDs, memory cards and flash drives are many and varied. They include personal computers (PCs), such as desktop or laptop and other portable computers, cellular telephones, personal digital assistants (PDAs), digital still cameras, digital movie cameras and portable audio players. For portable memory card applications, a host may include a built-in receptacle for one or more types of memory cards or flash drives, or a host may require adapters into which a memory card is plugged. The storage system usually contains its own memory controller and drivers but there are also some memory-only systems that are instead controlled by software executed by the host to which the memory is connected. In some storage systems containing the controller, especially those embedded within a host, the memory, controller and drivers are often formed on a single integrated circuit chip.

The host system 100 of FIG. 1 may be viewed as having two major parts, insofar as the storage system 102 is concerned, made up of a combination of circuitry and software. They are an applications portion 108 and a driver portion 110 that interfaces with the storage system 102. In a PC, for example, the applications portion 110 can include a processor 112 running word processing, graphics, control or other popular application software, as well as the file system 114 for managing data on the host 100. In a camera, cellular telephone or other host system that is primarily dedicated to performing a single set of functions, the applications portion 108 includes the software that operates the camera to take and store pictures, the cellular telephone to make and receive calls, and the like.

The storage system 102 of FIG. 1 may include non-volatile memory, such as a multi-bank flash memory 116, and a system controller 118 that both interfaces with the host 100 to which the storage system 102 is connected for passing data back and forth and controls the memory 116. The system controller 118 may convert between logical addresses of data used by the host 100 and physical addresses of the multi-bank flash memory 116 during data programming and reading. The multi-bank flash memory 116 may include two or more memory banks 120 and two memory banks are shown in FIG. 1 simply by way of illustration. Functionally, the system controller 118 may include a front end 122 that interfaces with the host system, controller logic 124 for coordinating operation of the flash memory 116. The system controller 118 also includes a media management layer (MML) 126 for internal memory management operations such as system initiation, writing data within a block, bad block management and handling block linkage information. The MML 126 may communicate with the flash memory 116 via a low level sequencer (LLS) 130 software module, where the LLS 130 is configured to translate commands from the MML 126 into flash commands understood by the multi-bank flash memory 116. Additionally, the system controller 118 includes one or more flash RISC (FR) modules 130 (sometimes referred to as flash interface modules or FIMs) to provide a hardware engine for handling data transfer between the controller 118 and the multi-bank flash memory 116.

Figure 2:
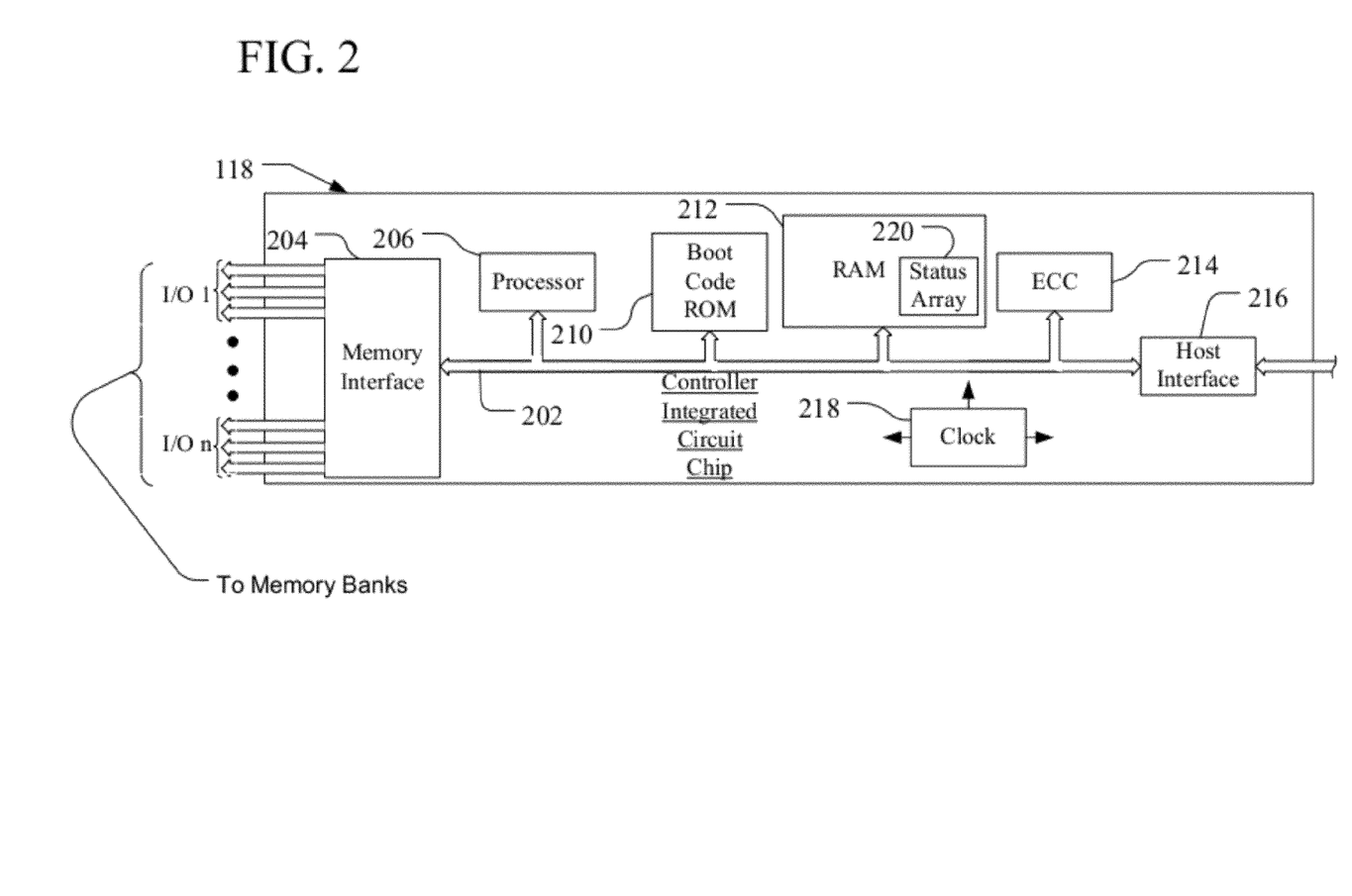
FIG. 2 is an example block diagram of an example flash storage device controller for use in the multi-bank non-volatile memory of FIG. 1.

The system controller 118 and may be implemented on a single integrated circuit chip, such as an application specific integrated circuit (ASIC) such as shown in FIG. 2. The processor 206 of the system controller 118 may be configured as a multi-thread processor capable of communicating separately with each of the respective memory banks 120 via a memory interface 204 having I/O ports for each of the respective banks 120 in the multi-bank flash memory 116. The system controller 118 may include an internal clock 218. The processor 206 communicates with an error correction code (ECC) module 214, a buffer RAM 212 having a bank status array 220, a host interface 216, and boot code ROM 210 via an internal data bus 202.

Figure 3:
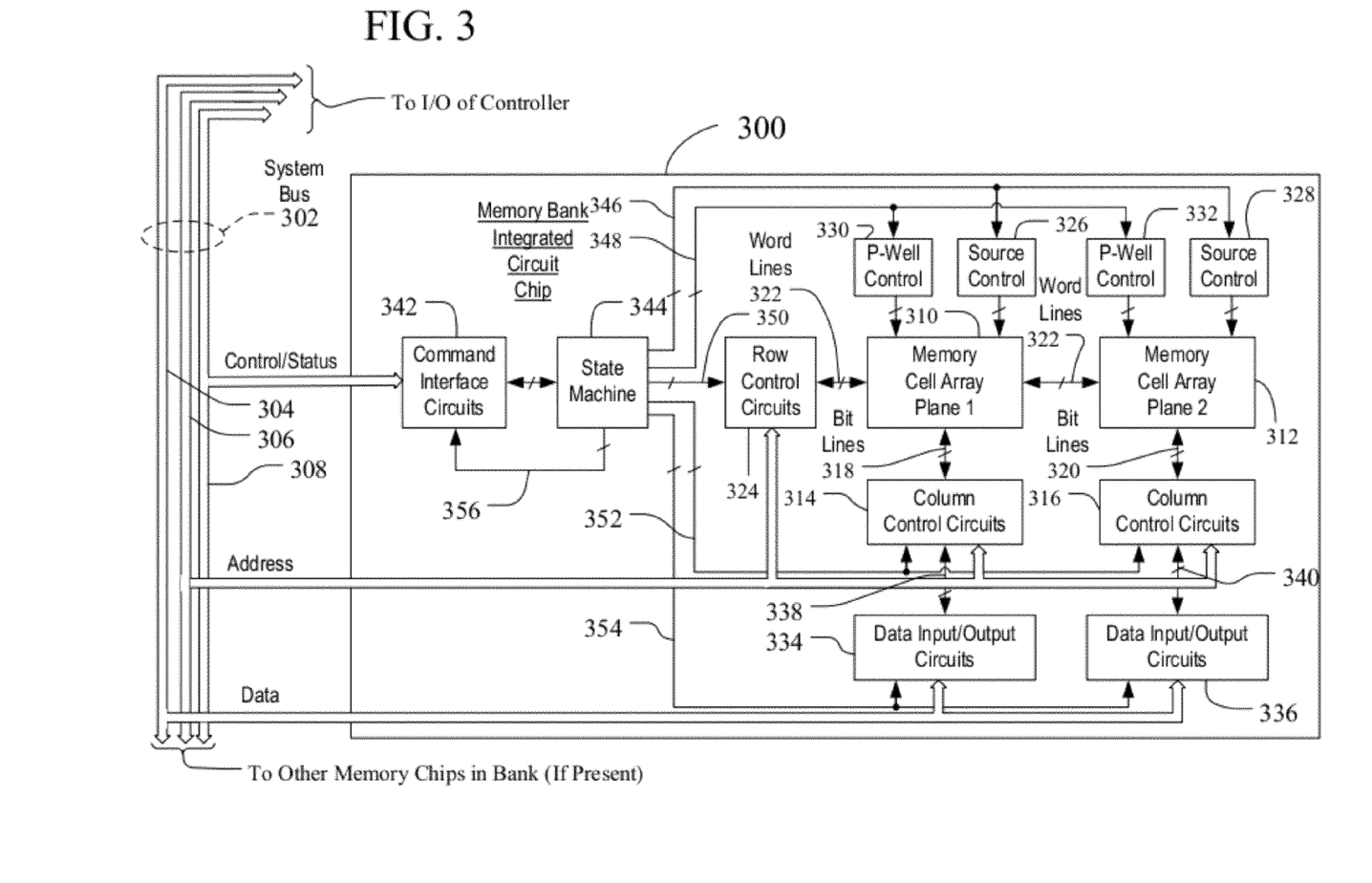
FIG. 3 is an example one flash memory bank suitable as one of the flash memory banks illustrated in FIG. 1.

Each bank 120 in the multi-bank flash memory 116 may consist of one or more integrated circuit chips, where each chip may contain an array of memory cells organized into multiple planes. An illustration of a memory bank 300 on a single chip is shown in FIG. 3. The memory bank 300 of FIG. 3 shows such planes 310 and 312 for simplicity but a greater number of planes, such as four or eight planes, may instead be used. Alternatively, the memory cell array of a memory bank may not be divided into planes. When so divided, however, each plane has its own column control circuits 314 and 316 that are operable independently of each other. The circuits 314 and 316 receive addresses of their respective memory cell array from the address portion 306 of the system bus 302, and decode them to address a specific one or more of respective bit lines 318 and 320. The word lines 322 are addressed through row control circuits 324 in response to addresses received on the address bus 19. Source voltage control circuits 326 and 328 are also connected with the respective planes, as are p-well voltage control circuits 330 and 332. If the bank 300 is in the form of a memory chip with a single array of memory cells, and if two or more such chips exist in the system, the array of each chip may be operated similarly to a plane within the multi-plane chip described above.

Data are transferred into and out of the planes 310 and 312 through respective data input/output circuits 334 and 336 that are connected with the data portion 304 of the system bus 302. The circuits 334 and 336 provide for both programming data into the memory cells and for reading data from the memory cells of their respective planes, through lines 338 and 340 connected to the planes through respective column control circuits 314 and 316.

Each memory chip in each bank 120 contains some controlling circuitry that executes commands from the controller 118 to perform such functions. Interface circuits 342 are connected to the control and status portion 308 of the system bus 302. Commands from the controller 118 are provided to a state machine 344 that then provides specific control of other circuits in order to execute these commands. Control lines 346-354 connect the state machine 344 with these other circuits as shown in FIG. 3. Status information from the state machine 344 is communicated over lines 356 to the interface 342 for transmission to the controller 118 over the bus portion 308.

A NAND architecture of the memory cell arrays 310 and 312 is discussed below, although other non-volatile memory architectures or technologies, alone or combination, such as NOR, can be used instead. An example NAND array is illustrated by the circuit diagram of FIG. 4, which is a portion of the memory cell array 310 of the memory bank 300 of FIG. 3. A large number of global bit lines are provided, only four such lines 402-408 being shown in FIG. 4 for simplicity of explanation. A number of series connected memory cell strings 410-424 are connected between one of these bit lines and a reference potential. Using the memory cell string 414 as representative, a plurality of charge storage memory cells 426-432 are connected in series with select transistors 434 and 436 at either end of the string. When the select transistors of a string are rendered conductive, the string is connected between its bit line and the reference potential. One memory cell within that string is then programmed or read at a time.

Figure 4:
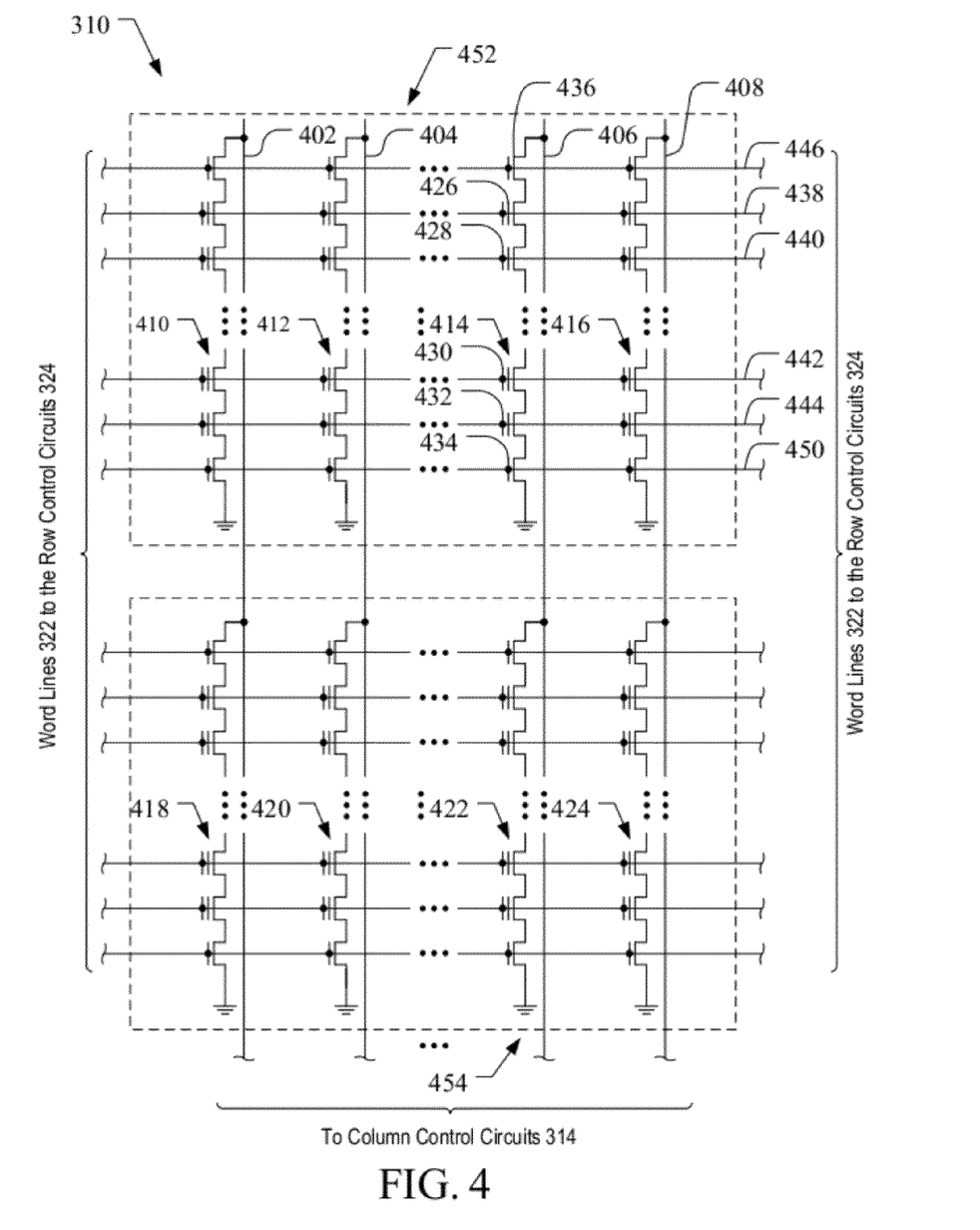
FIG. 4 is a representative circuit diagram of a memory cell array that may be used in the memory bank of FIG. 3.

Word lines 438-444 of FIG. 4 individually extend across the charge storage element of one memory cell in each of a number of strings of memory cells, and gates 446 and 450 control the states of the select transistors at each end of the strings. The memory cell strings that share common word and control gate lines 438-450 are made to form a block 452 of memory cells that are erased together. This block of cells contains the minimum number of cells that are physically erasable at one time. One row of memory cells, those along one of the word lines 438-444, are programmed at a time. Typically, the rows of a NAND array are programmed in a prescribed order, in this case beginning with the row along the word line 444 closest to the end of the strings connected to ground or another common potential. The row of memory cells along the word line 442 is programmed next, and so on, throughout the block 452. The row along the word line 438 is programmed last.

A second block 454 is similar, its strings of memory cells being connected to the same global bit lines as the strings in the first block 452 but having a different set of word and control gate lines. The word and control gate lines are driven to their proper operating voltages by the row control circuits 324. If there is more than one plane in the system, such as planes 1 and 2 of FIG. 3, one memory architecture uses common word lines extending between them. There can alternatively be more than two planes that share common word lines. In other memory architectures, the word lines of individual planes are separately driven.

The memory cells may be operated to store two levels of charge so that a single bit of data is stored in each cell. This is typically referred to as a binary or single level cell (SLC) memory. Alternatively, the memory cells may be operated to store more than two detectable levels of charge in each charge storage element or region, thereby to store more than one bit of data in each. This latter configuration is referred to as multi-level cell (MLC) memory. Both types of memory cells may be used in a memory, for example binary flash memory may be used for caching data and MLC memory may be used for longer term storage. The charge storage elements of the memory cells are most commonly conductive floating gates but may alternatively be non-conductive dielectric charge trapping material.

Figure 5:
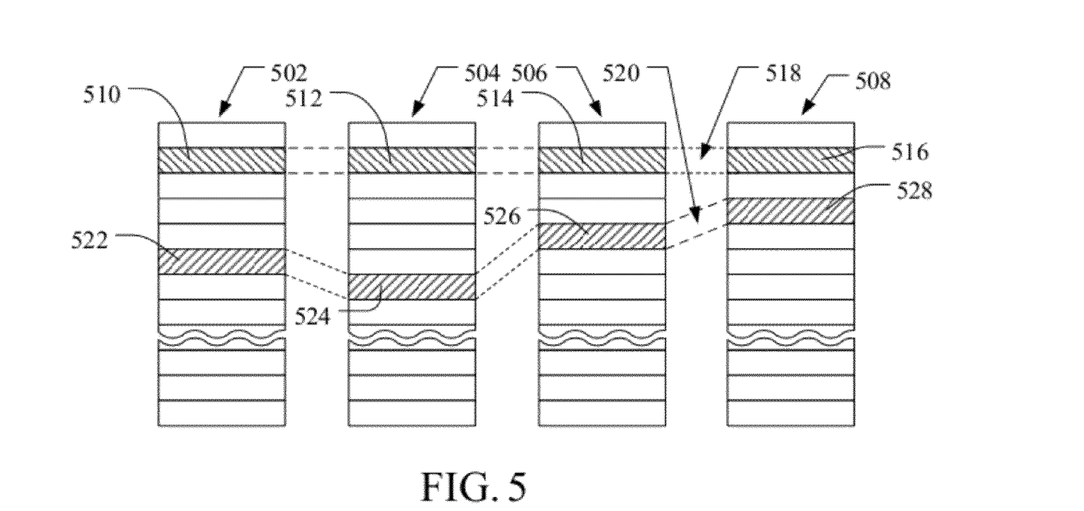
FIG. 5 illustrates an example physical memory organization of the memory bank of FIG. 3.

FIG. 5 conceptually illustrates an organization of one bank 120 of the multi-bank flash memory 116 (FIG. 1) that is used as an example in further descriptions below. Four planes 502-508 of memory cells may be on a single integrated memory cell chip, on two chips (two of the planes on each chip) or on four separate chips. The specific arrangement is not important to the discussion below. Of course, other numbers of planes, such as 1, 2, 8, 16 or more may exist in a system. The planes are individually divided into blocks of memory cells shown in FIG. 5 by rectangles, such as blocks 510, 512, 514 and 516, located in respective planes 502-508. There can be hundreds or thousands of blocks in each plane.

As mentioned above, the block of memory cells is the unit of erase, the smallest number of memory cells that are physically erasable together. For increased parallelism, however, the blocks are operated in larger metablock units. One block from each plane is logically linked together to form a metablock. The four blocks 510-516 are shown to form one metablock 518. All of the cells within a metablock are typically erased together. The blocks used to form a metablock need not be restricted to the same relative locations within their respective planes, as is shown in a second metablock 520 made up of blocks 522-528. Although it is usually preferable to extend the metablocks across all of the planes, for high system performance, the storage system can be operated with the ability to dynamically form metablocks of any or all of one, two or three blocks in different planes. This allows the size of the metablock to be more closely matched with the amount of data available for storage in one programming operation.

Figure 6:
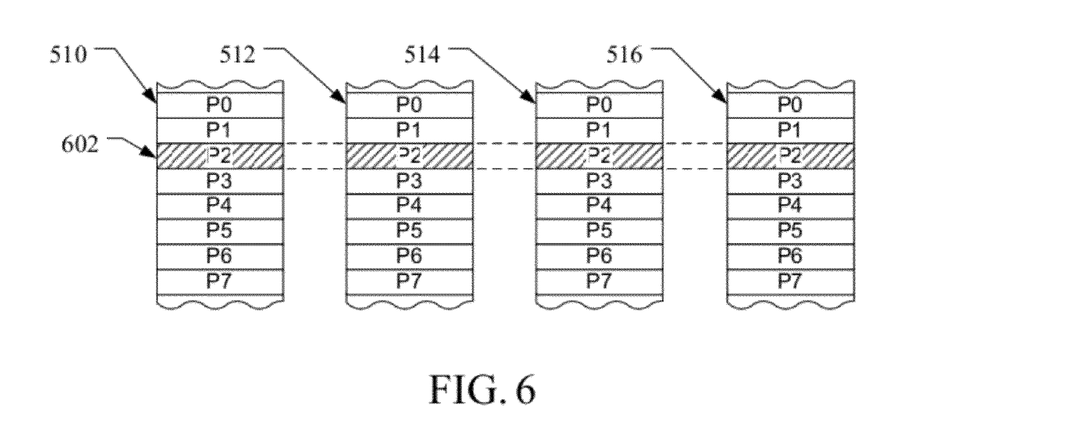
FIG. 6 shows an expanded view of a portion of the physical memory of FIG. 5.

The individual blocks are in turn divided for operational purposes into pages of memory cells, as illustrated in FIG. 6. The memory cells of each of the blocks 510-516, for example, are each divided into eight pages P0-P7. Alternatively, there may be 16, 32 or more pages of memory cells within each block. The page is the unit of data programming within a block, containing the minimum amount of data that are programmed or read at one time. In the NAND architecture of FIG. 3, a page is formed of memory cells along a word line within a block. However, in order to increase the storage system operational parallelism, such pages within two or more blocks may be logically linked into metapages. A metapage 602 is illustrated in FIG. 6, being formed of one physical page from each of the four blocks 510-516. The metapage 602, for example, includes the page P2 in each of the four blocks but the pages of a metapage need not necessarily have the same relative position within each of the blocks. Within a bank, a metapage is the maximum unit of programming.

As noted above, FIGS. 5-6 illustrate one embodiment of the memory cell arrangement that may exist in one memory bank 120 of the multi-bank memory 116. In one embodiment, each bank 704 may consist of a plurality of blocks and is associated with a fixed address range of host LBA addresses that differs from the other bank in the multi-bank memory 700 such that host data associated with those addresses will be handled exclusively by a particular bank. Each bank is capable of operating independently of the other bank. Although only 2 banks are illustrated for simplicity, larger numbers of banks may be utilized and the unique LBA address ranges and independent operating capability features would similarly apply. The number of banks 704 to use for a particular design may be set by the parallelism that is necessary for the storage system to achieve a specified sequential write speed.

Figure 7:
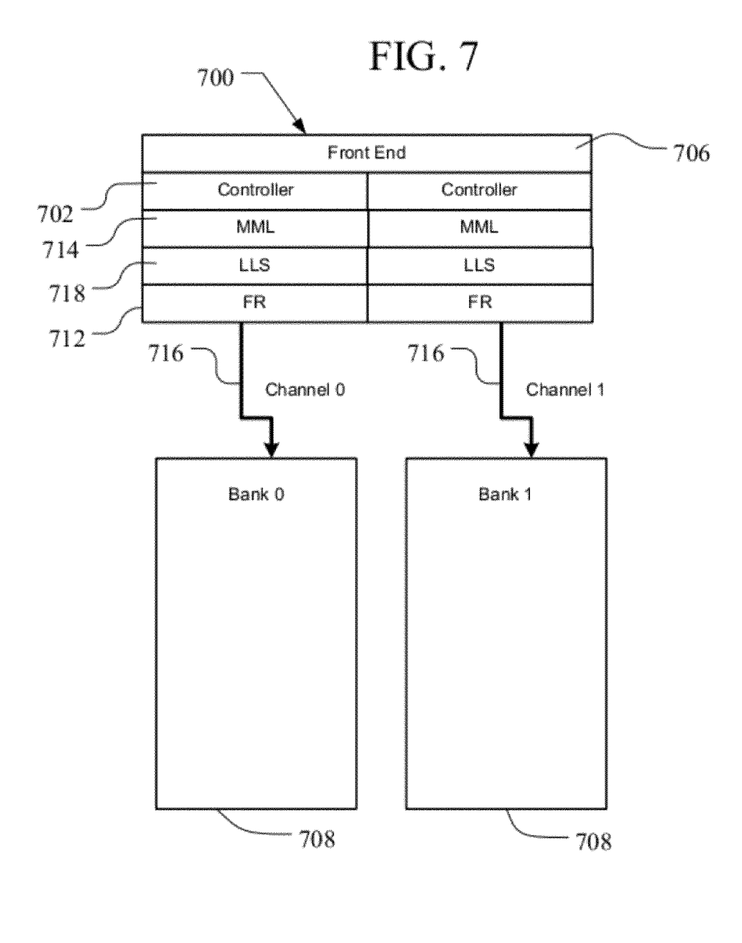
FIG. 7 illustrates an embodiment of the storage system of FIG. 1 with a controller ASIC and a multi-bank memory.

In order to achieve independent operation of each bank with respect to each other bank, each bank may be associated with a separate controller. The controller may be a single hardware controller on a die separate from that of each of the banks 120, as illustrated in FIGS. 1-2, that operates a separate instance of a firmware for each bank. FIG. 7 illustrates a functional block diagram 700 of the system controller circuit 118 of FIGS. 1-2 arranged with multiple firmware controllers 702, where each instance of a firmware controller 702 is dedicated to a respective one of the banks. The firmware controllers 702 may be any of a number of known firmware controllers including a firmware controller configured with storage address remapping (STAR) functionality. More detail on STAR functionality may be found in U.S. Pub. No. 2008/0307192 A1 (U.S. application Ser. No. 12/036,014) the entirety of which is incorporated herein by reference.

As shown in FIG. 7, the system controller circuit 700 may be arranged as a front end portion 706 that implements a host interface, for example a serial ATA interface, where RAM, such as DRAM is used to cache incoming host data. The processor 206 (FIG. 2) in the storage device is also configured to execute firmware or software to direct data in predetermined host LBA ranges to the firmware controller 702 of the appropriate bank 708. Each autonomous instance of a firmware controller 702 is also associated with a media management layer 714. Examples of flash management routines controlled by the MML 714 include system initiation, writing data within a block, bad block management and handling block linkage information. Low level sequencer software 718 translates commands from the MML 714 into commands understood by the memory banks 708. One or more flash RISC 712 circuits provide a mechanism for writing and reading data to and from the memory banks 708. The flash management routines may be handled by each instance of firmware controller 702, by processors or logic in each bank 708, or by a combination of the two.

In the embodiment of FIG. 7, each bank 708 is shown as having a single channel 716 for routing data from the controller circuit 700, such that a FR 712 is used per bank 708. The number of FRs 712 and the number of channels 716 may vary in different implementations. For example, as set forth in greater detail below, each bank 708 may be further partitioned into independent subarrays of fixed logical address ranges such that each subarray may have a dedicated channel and corresponding dedicated FR 712 in other implementations. Although in one embodiment it may be preferred to have one FR 712 per channel 716, more than one channel 716 may share a FR in other embodiments. Also, more than one integrated circuit chip (die) in a bank may share the same FR 712. As long as use of a part in the controller or multi-bank memory will not cause a communication bottleneck, controller circuit and multi-bank memory configurations are contemplated where faster parts may be shared.

Figure 8:
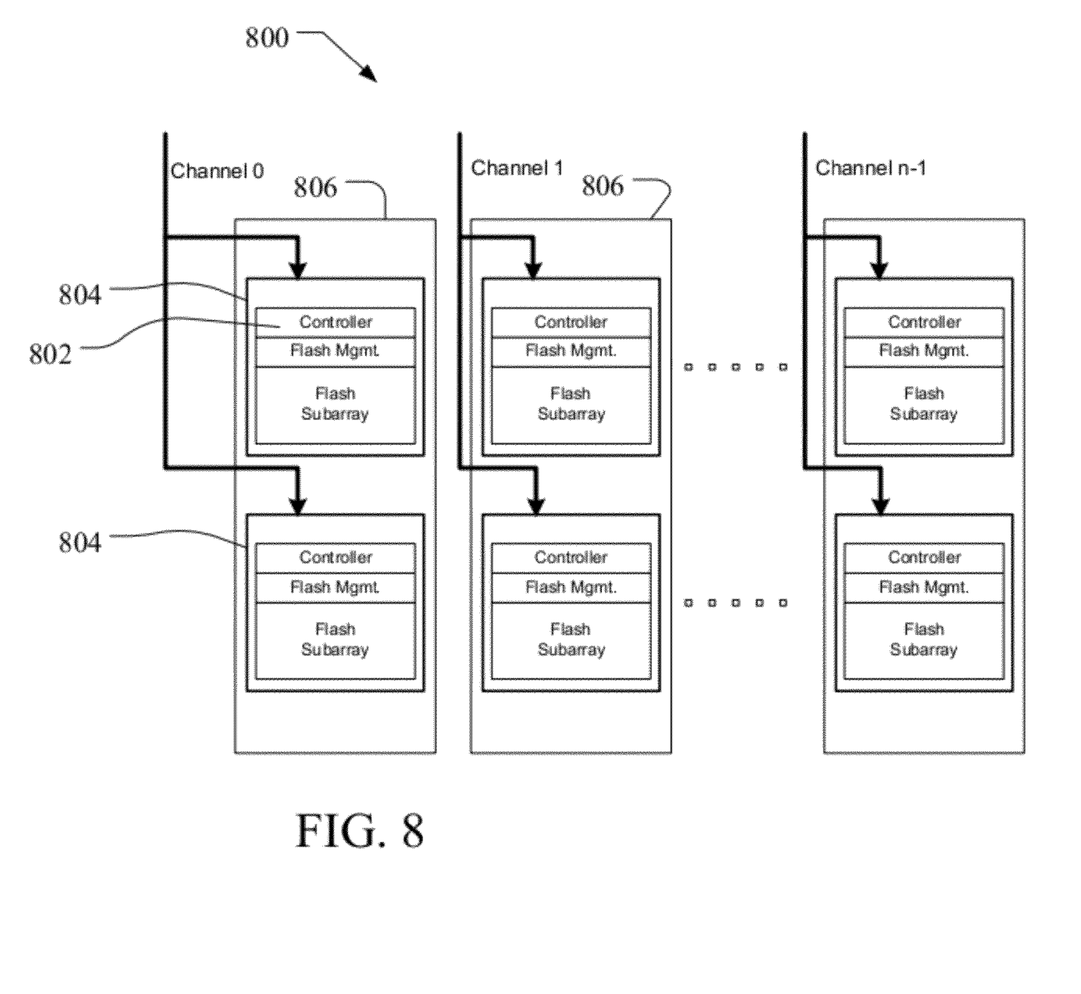
FIG. 8 illustrates an alternative multi-bank memory arrangement having controller functionality included in each bank of the multi-bank memory.

In an alternative embodiment, instead of the discrete controller circuit 700 and banks 708 of FIG. 7, the storage system 102 may include separate hardware controllers in each of the banks. As illustrated in FIG. 8, the storage system 800 may include banks 806 that include separate controller hardware 802 that is fabricated on each die that makes up the storage system. Alternatively, a separate hardware controller may be packaged together with one or more flash memory die. Although certain functionality for the banks 806 is still located in a system controller (not shown) similar to that of FIG. 7, separate hardware controllers 802 are included with each flash subarray 804 to handle the local read, write and flash management routines for the flash subarray 804 associated with the controller 802.

Regardless of the particular distribution of controller hardware and firmware in the above alternative configurations of the storage system, each of the banks is assigned a fixed group of host LBA addresses. In embodiments where banks are further partitioned into independent subarrays 804 as shown in FIG. 8, each subarray is assigned a unique fixed portion of the fixed group of logical addresses for the bank. Also, each bank 708, 806 is operated by a controller 702, 802, whether by a discrete hardware controller 802 or an instance of a firmware controller that is sharing a processor with other instances of the firmware controller. In embodiments where subarrays are used, each subarray is independently operated by a separate hardware or firmware controller. Thus, each subarray 804 may be independently operated with respect to the other subarrays 804. A central routing function of incoming data is handled at the front end 706 to direct data received from the host to the correct bank 806 or subarray 804 and controller 802 pairing based on the host LBA addresses of the incoming data.

Referring again to FIGS. 1-2, one example front end 122 is seen in FIG. 1 where the host interface in the front end 122 may include any of a number of known interfaces, such as a serial ATA interface (SATA). The front end 122 may handle caching of data from the host 100 with a volatile or non-volatile cache memory. Buffer RAM 212, which may be in the form of DRAM, is shown in FIG. 2. A processor 206 in the front end 122 manages separation and routing of data from the host to the appropriate subarray based on the host LBA addresses that have been preassigned to each subarray. In implementations where the processor 206 is separate from the memory die as in FIG. 7, the processor 206 may also be used to execute the controller firmware 702. A mapping of the preassigned host LBA addresses and banks (or subarrays) may be maintained in a table and checked by the front end 122 against host LBA addresses of data arriving from the host or the mapping may be determined by the front end 122 executing an algorithm against the incoming data host LBA addresses to sort the data to the appropriate bank or subarray. For example, sequential LBA addresses in the address space at the host interface may be interleaved in bursts amongst individual subarrays. In one implementation, if each burst contains 64 LBA addresses and there are 8 subarrays, address bits 0 to 5 may define an LBA within a page of a subarray and address bits 6 to 8 may define the subarray which should be addressed. The LBA address received at the host interface may be passed directly to the subarray addressed by bits 6 to 8, after bits 6 to 8 have been removed from it. The front end 122 may be logic in the same ASIC 208 that houses the controller functions, such as shown in FIG. 2, a collection of one or more discrete circuits, or a combination of the two.

Utilizing any of the various storage system configurations disclosed above, where each bank is independently operable relative to the other banks in one embodiment, or each subarray in a bank is independently operable relative to the other subarrays in another embodiment, synchronized maintenance operations may be used to minimize delays of host write commands. As discussed herein, a maintenance operation is defined herein as any activity not necessary for execution of a host command. Some maintenance operations may include copy operations such as garbage collection, which is generic term defining cleaning up and freeing up obsolete capacity in memory. Garbage collection may be performed on a block-per-block basis, across blocks, or on only part of a block. Garbage collection may consist of copying remaining valid data from a previously written block to a new block in the same bank so that the previously written block may be recycled for later use. One type of garbage collection includes garbage collection necessitated by a host command where valid data from a block that has had some data made obsolete is copied to another block and consolidated with updated data corresponding to the data made obsolete by the host command in order to keep certain groups of logical addresses together.

Other examples of maintenance operations involving a copy operation include, without limitation, compaction, relocation, eviction, consolidation and folding operations. Compaction is a subset of garbage collection referring garbage collection of a single block where valid data is copied to one destination block. Folding refers to operations where data is copied from binary (SLC) flash to MLC flash. Relocation is similar to compaction and refers to a copy of a targeted portion of data, which may be smaller or larger than a block (or partial block). Eviction is a copy operation from one category of storage to another, for example from a binary cache to an update block in the memory. Consolidation refers to a copy operation such as copying scattered pieces of data into logical groups. Non-copy maintenance operations, in other words maintenance operations that do not involve copying data to or from different blocks, are also contemplated, such as a read disturb or read scrub operation where banks are scanned for block errors. For additional details on the read disturb and read scrub operations, reference is made to U.S. Pat. Nos. 7,012,835 and 7,349,258, and the entirety of each is incorporated herein by reference.

Figure 9:
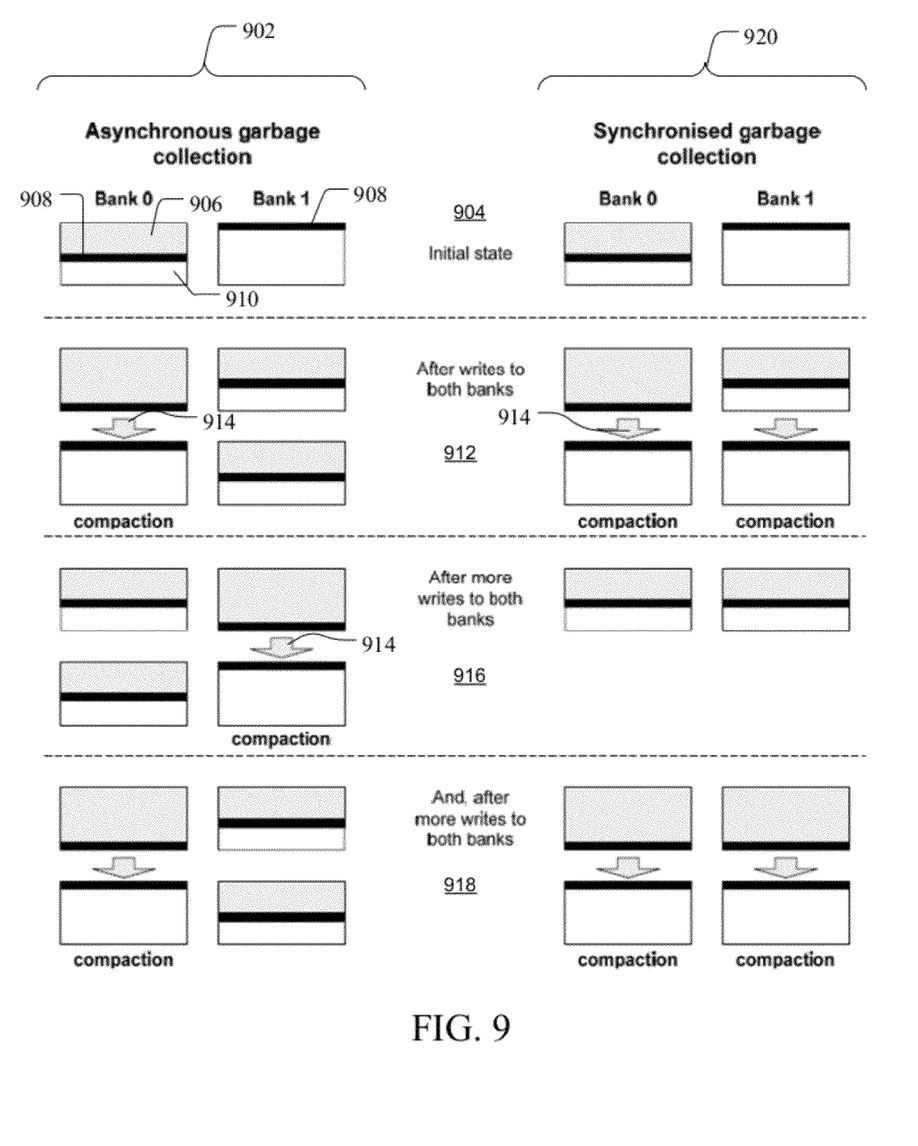
FIG. 9 is a comparison of asynchronous and synchronous maintenance operations.

To illustrate the timing issues of maintenance operations in a multi-bank memory, a sequence of operations is shown in FIG. 9 for a hypothetical garbage collection in a multi-bank memory with two banks. The asynchronous garbage collection sequence 902 shows an initial state 904 where an update block (or binary cache) in Bank 0 and Bank 1 each starts with a respective amount of obsolete data 906, valid data 908 and free space 910. At a next point in time 912 after a number of write commands from a host are executed, Bank 0 needs to perform a garbage collection operation 914 to obtain more free space 910. In the garbage collection operation 914, which is illustrated as compaction type of garbage collection because of the one-to-one block copy operation, the valid data 908 from the original block is copied to a new block. A write command that arrives now from a host which includes data for both banks will be delayed until the garbage collection is finished in Bank 0 when the buffer RAM for the multi-bank memory is too small or too full to handle data meant for Bank 0. Because Bank 1 knows that a write command with data intended for it is pending, Bank 1 not only has to wait for Bank 0 to finish its foreground maintenance operation before it can receive data, but Bank 1 also cannot enter a background mode while it knows a write command directed to it is pending.

At a first subsequent point in time 916 after more host write commands have been executed, Bank 1 has run out of free space 910 and must execute a garbage collection operation 914. A host write command that arrives now may again be delayed until this maintenance operation in Bank 1 is completed. At a second subsequent point in time 918 after yet more host write commands have been executed to the banks, garbage collection 914 is needed again in Bank 0, which may delay a pending host write command to both banks. Thus in the asynchronous garbage collection sequence 902, the banks engage in maintenance operations at different times and delays in executing pending host write commands can be large. Extrapolating the sequence of events illustrated in the simple two bank asynchronous scenario 902 to a memory device with many banks where host write commands include data intended for more than two banks at once, the delays to writing host data can be quite large.

In contrast, as explained in greater detail below, a synchronized garbage collection operation 920 is also shown in FIG. 9 according to one embodiment. A memory having multiple banks that implements a synchronous garbage collection may minimize delays of maintenance operations by coordinating, or synchronizing, maintenance operations in the banks. The status of the banks in the initial state 904 of synchronous garbage collection scenario 920 is the same as in the asynchronous scenario 902. However, instead of Bank 0 engaging in a foreground maintenance operation, such as garbage collection 914, while a host write command is pending and Bank 1 remaining stalled at the next point in time 912, the memory device instructs Bank 1 to initiate a garbage collection operation 914 at the same time. The garbage collection operation in Bank 1 is initiated even though Bank 1 may not have reached the typical threshold amount of obsolete data to trigger a garbage collection. At the first subsequent point in time 916, Bank 1 does not need to delay by engaging in a maintenance operation as in the asynchronous scenario 902 because it was able to take care of at least some garbage collection requirements synchronously with Bank 0 at the prior point in time 912. At the second subsequent point in time 918, both Bank 0 and Bank 1 are engaged in another synchronous garbage collection operation. Thus, what would otherwise be wasted time in Bank 1 while Bank 0 was engaged in a maintenance operation is used to engage Bank 1 in a concurrent maintenance operation. The potential benefit of synchronizing the maintenance fee operations in a multibank memory is even greater when larger numbers of banks are considered. Also, although garbage collection is specifically mentioned in the above example, any maintenance operation or different combinations of maintenance operations in the various banks is contemplated.

Figure 10:
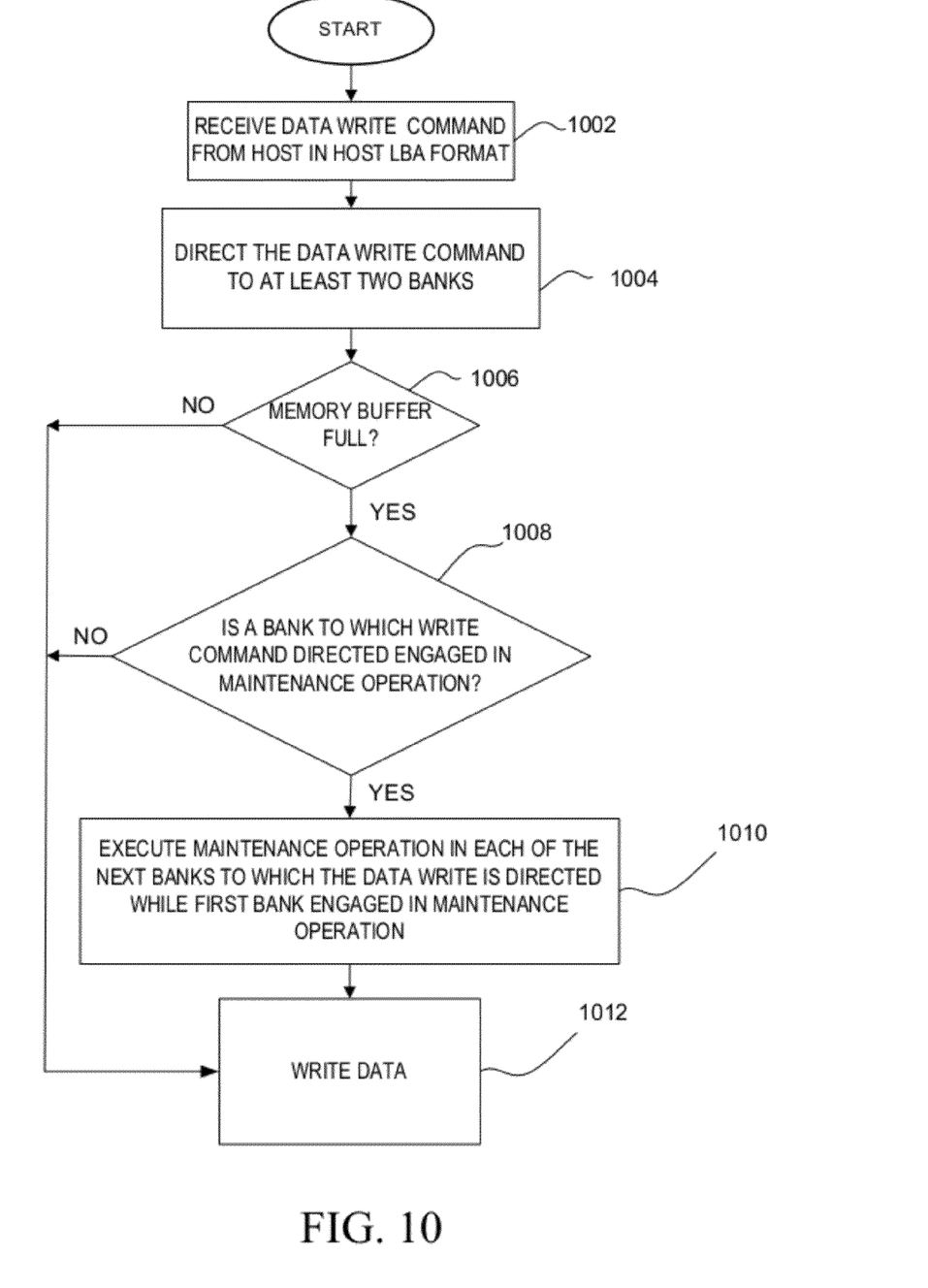
FIG. 10 is a flow diagram illustrating a method of implementing synchronous maintenance operations in multi-bank memory.

In accordance with one embodiment, as illustrated in FIG. 10, a method of synchronizing maintenance operations in a multi-bank memory includes receiving a host data write command from a host file system 10 in the host LBA format (at 1002). As the host data is received, the front end 806 selects the controller 802 and bank (or bank and subarray) that are associated with the host LBA address for the received data (at 1004) by either comparing LBA addresses to tables of LBA address-to-bank/subarray mappings or applying an algorithm to the LBA addresses to achieve the proper mapping. The received host write command preferably is associated with a logically contiguous region of data having a run of LBA addresses in LBA address order. The host data write command also preferably includes LBA addresses associated with the LBA address ranges of at least two of the banks so that, in a two bank storage system, the data will be striped across both banks where a "head" of the host data write command will be directed to the first bank and a "tail" of the host data write command will be directed to the second bank. The head of the command being associated with LBA addresses of lower number order than the tail. The controller then checks to see if the buffer RAM for the banks is full (at 1006). If not, the controller requests the data from the host and the data may be written to the memory device.

If the buffer RAM for the storage device is too full to accept data, the controller determines if a bank is currently engaged in a maintenance operation while the host write command with data directed to that bank is pending (at 1008). If there is a bank to which the host write command is directed that is busy with a maintenance operation, then a maintenance operation is initiated in each of the subsequent banks for no longer than the bank determined to be already engaged in a maintenance operation is executing a maintenance operation (at 1010). After the bank determined to be executing a maintenance operation completes the operation, the remaining bank or banks data will have finished their respective maintenance operations and the data for the banks may be written into the banks.

Figure 11:
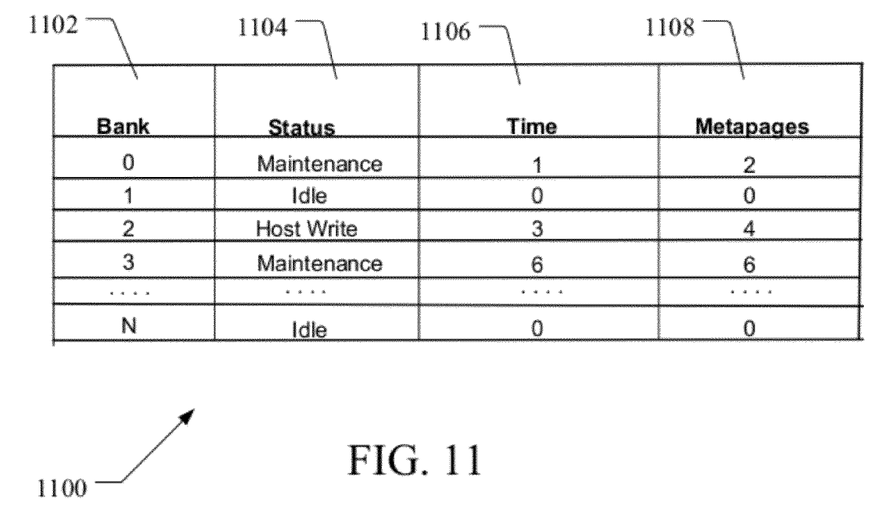
FIG. 11 is an embodiment of status table indicating a status of each of a plurality of banks in a multi-bank memory.

Referring again to FIGS. 7 and 8, each bank may be associated with a separate controller, or controller thread of a single hardware controller, and all of the banks may have buffer RAM 212 with which each bank may, for example, temporarily store data from the host before storage in the bank. The buffer RAM 212 may be a single memory that can be flexibly partitioned so that each bank in the multi-bank memory has access to its own chunk of the buffer RAM 212. The buffer RAM 212 may also contain a status array 220 or table which stores updates from each bank regarding that bank's status. Any of a number of types of status may be tracked. For example, the status might indicate that a bank is idle, writing data (in some embodiments with further granularity of information such as a fast write or a slow write), performing a maintenance operation (e.g. garbage collection pending), or various combinations of these or other status types. As illustrated in FIG. 11, in one embodiment, a status table 1100 version of a status array may include not only information on each bank 1102 and the type of activity (Status) 1104, but may also provide additional information related to the timing 1106 (start time, end time and/or duration in different embodiments) associated with the current status of a bank or the number of metapages 1108 that the bank's activity will involve. This additional information may be used by the storage device to fine tune the timing of a maintenance operation initiated in a bank that is waiting on another bank to finish a maintenance operation. Alternative embodiments of a status table may include some, all, or more categories and/or information than are illustrated in FIG. 11 depending on the sophistication desired for implementing the pre-emptive maintenance operation management described herein.

With reference to the embodiment of FIG. 7, the LLS 718 for each bank 708 may set the state (e.g. idle, performing maintenance operation—including type of maintenance, processing host write, etc.) for its respective bank in a data array 220 (FIG. 2) of the controller circuit 700. When a host write command is received that includes data for both banks 708, the flash RISC 712 for Bank 1 is informed by the front end 706. Flash RISC (FR) 712 for Bank 1 attempts to initiate a write operation, but notices that the data has not arrived after some threshold amount of time, for example 5 milliseconds, and times out. From the point of view of Bank 1, it looks like the host is slow, but the LLS 718 of Bank 1 checks the status of Bank 0 in the status array to determine the status of Bank 0. If the LLS 718 for Bank 1 returns information to the MML 714 for Bank 1 that Bank 0 is processing the host write command, then Bank 1 assumes that the host is the cause of the delay and the Flash RISC for Bank 1 is instructed to restart the write process. The write process may be restarted when the Flash RISC for Bank 1 "wakes up" and looks to the MML 714 for Bank 1 for instructions.

Alternatively, if the LLS 718 returns status information indicating that Bank 0 is performing a maintenance operation, then the MML 714 determines if Bank 1 has any maintenance work to do. Assuming there is a need for a maintenance operation in Bank 1, such as a garbage collection operation as illustrated in the synchronous garbage collection scenario of FIG. 9, then the MML 714 initiates an amount of maintenance work and instructs the LLS 718 to check again on the status of Bank 0 and the MML performs another amount of maintenance in Bank 1 while the maintenance operation in Bank 0 is still being performed. The process of checking the status of Bank 0 and performing another small amount of maintenance in Bank 1 is repeated while there is still maintenance needed in Bank 1 until the status of Bank 0 changes.

In other implementations, the status information returned from the status array by the LLS 718 may include specific timing information regarding the maintenance operation in Bank 0. The specific timing information, such as a time duration or a number of metapages left to be copied, may be used to ensure that the pre-emptive maintenance operation in Bank 1 does not extend past the time that the maintenance operation takes place in Bank 0. This additional information may obviate the need for the LLS 718 of Bank 1 to keep checking status of Bank 0. In either implementation, the operation in Bank 1 will not exceed the overhead time of Bank 0. In yet other implementations, rather than checking a status array, the status of Bank 0 may be determined by the LLS 718 of Bank 1 checking directly with the FR 712 of Bank 0 to see if Bank 0 is performing a copy operation. A check of the FR status may be accomplished by accessing a flag in RAM or some other register that is accessible to Bank 1.

The maintenance operation pre-emptively initiated in Bank 1 upon learning that Bank 0 is stalling execution of a write command may be selected from a priority list that the MML for Bank 1 maintains based on Bank 1's particular needs. The particular maintenance operation selected may be selected to fit time constraints, rather than the highest priority maintenance operation for the bank, if the highest priority maintenance operation (e.g. garbage collection) would take more time than the time available from Bank 0's delay. The maintenance operation in Bank 1 in this example is considered preemptive because Bank 1 may not meet the ordinary maintenance operation trigger threshold. With reference to a garbage collection operation, the threshold might ordinarily be to allow garbage collection if a block is more than Y % full or if a block contains more than N % obsolete data. To take advantage of the time slot provided by, for example, a foreground garbage collection operation in Bank 0 where the Y % or N % threshold has been met, a lower threshold of blocks being X % full or contain more than M % obsolete data may be used (where X<Y and M<N) for Bank 1.

Although examples of a multi-bank storage device having two banks have been described for simplicity of illustration, the synchronized maintenance operation techniques described herein are equally applicable to storage devices with greater that two banks. Each additional bank that is part of a pending host write command that is being delayed by another bank associated with logical addresses included in the write command would independently perform the steps of Bank 1 and utilize the time delay by the detected maintenance operation to pre-emptively execute any of a number of different maintenance operations. Each of the other banks detecting the maintenance operation of the other bank or banks delaying execution of a write command may select its own preferred maintenance operation to execute synchronously with the other bank, or the storage device may select a default maintenance operation that is executed in all other affected banks.

A system and method has been described for taking advantage of overhead time for a maintenance operation in a first bank that delays execution of a pending host write directed to other banks in a multi-bank storage device. The status of the bank causing the delay is detected by the other banks and pre-emptive maintenance operations are initiated in the other affected banks that will be terminated no later than the end of the maintenance operation in the bank originally delaying execution of the host write command. This ability to engage in concurrent, or synchronous, maintenance operations can help avoid the performance problems that may occur with concatenated, asynchronous maintenance operations.

It is intended that the foregoing detailed description be understood as an illustration of selected forms that the invention can take and not as a definition of the invention. It is only the following claims, including all equivalents, that are intended to define the scope of this invention. Also, some of the following claims may state that a component is operative to perform a certain function or configured for a certain task. It should be noted that these are not restrictive limitations. It should also be noted that the acts recited in the claims can be performed in any order and not necessarily in the order in which they are recited.

We claim:

1. A method of managing maintenance operations in a non-volatile storage device, the method comprising:
   in the non-volatile storage device having a controller and a plurality of banks of memory cells, wherein each of the plurality of banks is arranged in blocks of memory cells that are erasable together, the controller:
      receiving a data write command and associated data from a host system for storage in the non-volatile storage device;
      directing a head of the data write command to a first bank in the plurality of banks and a tail of the data write command to a second bank in the plurality of banks, wherein the head of the data write command comprises data having logical block addresses preceding logical block addresses of data in the tail of the data write command; and
      executing a second bank maintenance procedure in the second bank while the data write command directed to the first and second banks is pending when a status of the first bank delays execution of the data write command.

2. The method of claim 1, wherein the status of the first bank comprises the first bank currently executing a first bank maintenance procedure and a buffer of the first bank being unable to store data associated with the head of the data write command.

3. The method of claim 2, further comprising executing the second bank maintenance procedure only while the first bank maintenance procedure is being executed.

4. The method of claim 1, wherein the first bank maintenance procedure comprises a data copy procedure.

5. The method of claim 4, wherein the data copy procedure comprises a garbage collection procedure.

6. A method of managing maintenance operations in a non-volatile storage device, the method comprising:
   in the non-volatile storage device having a controller and a plurality of banks of memory cells, wherein each of the plurality of banks is arranged in blocks of memory cells that are erasable together, the controller:
      receiving a data write command and associated data from a host system for storage in the non-volatile storage device;
      directing the data write command to at least two banks of the plurality of banks to store the received data;
      detecting for a next bank of the at least two banks a status of a first bank of the at least two banks; and
      executing a second maintenance procedure in the next bank of the at least two banks when a data buffer for the first bank is full and the first bank is detected to be executing a first maintenance procedure while the data write command directed to the at least two banks is pending.

7. The method of claim 6, wherein executing the second maintenance procedure comprises executing the second maintenance procedure only while the first maintenance procedure is being executed.

8. The method of claim 7, wherein executing the first maintenance procedure comprises executing a first garbage collection procedure.

9. The method of claim 8, wherein executing the second maintenance procedure comprises executing a second garbage collection procedure.

10. The method of claim 8, wherein the second maintenance procedure comprises a non-copy procedure.

11. The method of claim 6, wherein executing the second maintenance procedure comprises executing a different maintenance procedure than the first maintenance procedure.

12. The method of claim 6, further comprising updating a status array in the non-volatile storage system with a current status of each of the plurality of banks, and wherein detecting for the next bank of the at least two banks the status of the first bank comprises the next bank accessing the status array.

13. The method of claim 12, wherein the next bank accessing the storage array comprises the next bank accessing time duration information for the first maintenance procedure, and wherein executing the second maintenance procedure comprises the next bank executing the second maintenance procedure for a time that does not exceed the accessed time duration information for the first maintenance procedure.

14. The method of claim 6, wherein each of the plurality of banks comprises a flash memory access engine and wherein detecting for the next bank of the at least two banks the status of the first bank comprises the next bank detecting a status of a flash memory access engine of the first bank to determine if the first bank is engaged in a maintenance operation.

15. A non-volatile memory device comprising:
   a non-volatile storage, the non-volatile storage having a plurality of banks of memory cells, wherein each of the plurality of banks is arranged in blocks of memory cells that are erasable together; and
   a controller in communication with the plurality of banks of memory cells, the controller configured to:

receive a data write command and associated data from a host system for storage in the non-volatile storage system;

direct a head of the data write command to a first bank in the plurality of banks and a tail of the data write command to a second bank in the plurality of banks, wherein the head of the data write command comprises data having logical block addresses preceding logical block addresses of data in the tail of the data write command; and execute a second bank maintenance procedure in the second bank while the data write command directed to the first and second banks is pending when a status of the first bank delays execution of the data write command.

16. The non-volatile memory device of claim 15, wherein the status of the first bank comprises the first bank currently executing a first bank maintenance procedure and a buffer of the first bank being unable to store data associated with the head of the data write command.

17. The non-volatile memory device of claim 16, wherein the controller is further configured to execute the second bank maintenance procedure only while the first bank maintenance procedure is being executed.

18. The non-volatile memory device of claim 15, wherein the first bank maintenance procedure comprises a data copy procedure.

19. The non-volatile memory device of claim 18, wherein the data copy procedure comprises a garbage collection procedure.

20. The non-volatile memory device of claim 15, further comprising a volatile memory having a status array containing a current status of each of the plurality of banks, and wherein the controller is further configured to determine the status of the first bank by accessing the status array.

21. The non-volatile memory device of claim 20, wherein the status array further comprises time duration information for the first bank maintenance procedure and wherein the controller is further configured to execute the second bank maintenance procedure for a time that does not exceed the time duration information for the first bank accessed from the status array.

* * * * *